United States Patent [19]
Weber

[11] Patent Number: 4,566,789
[45] Date of Patent: Jan. 28, 1986

[54] PANORAMIC VIEW BORE EXAMINING APPARATUS

[75] Inventor: William E. Weber, Highland Park, Ill.

[73] Assignee: Radiation Equipment Company, Inc., Highland Park, Ill.

[21] Appl. No.: 514,574

[22] Filed: Jul. 18, 1983

[51] Int. Cl.[4] ...................... G01N 21/88; G01N 21/01
[52] U.S. Cl. .................................... 356/241; 356/244
[58] Field of Search ............................... 356/241, 244

[56] References Cited

U.S. PATENT DOCUMENTS 3,221,593  12/1965  Ferris .................................. 356/241
4,268,169  5/1981  Stenning ............................. 356/241

FOREIGN PATENT DOCUMENTS 241155  7/1965  Austria ................................ 356/241

*Primary Examiner*—Vincent P. McGraw
*Attorney, Agent, or Firm*—Russell E. Hattis; Stephen R. Arnold

[57] ABSTRACT

A bore examining apparatus comprises an article support, a reflector support on one side of the article support, a microscope body or other magnifying means on the other side of the article support, and a reflector mountable on the reflector support. The reflector is configured with a convex reflecting surface forming a solid of revolution about an axis coaxial with respect to the longitudinal axis of the bore being examined, the reflector facing the through hole when supported on the reflector support, so that the reflected image of the bore is directed towards the microscope and produces therein a 360° panoramic view of the interior walls of the bore. The article support means is movable relative to the reflector support and magnifying means so as to move the viewing field along the bore.

9 Claims, 8 Drawing Figures

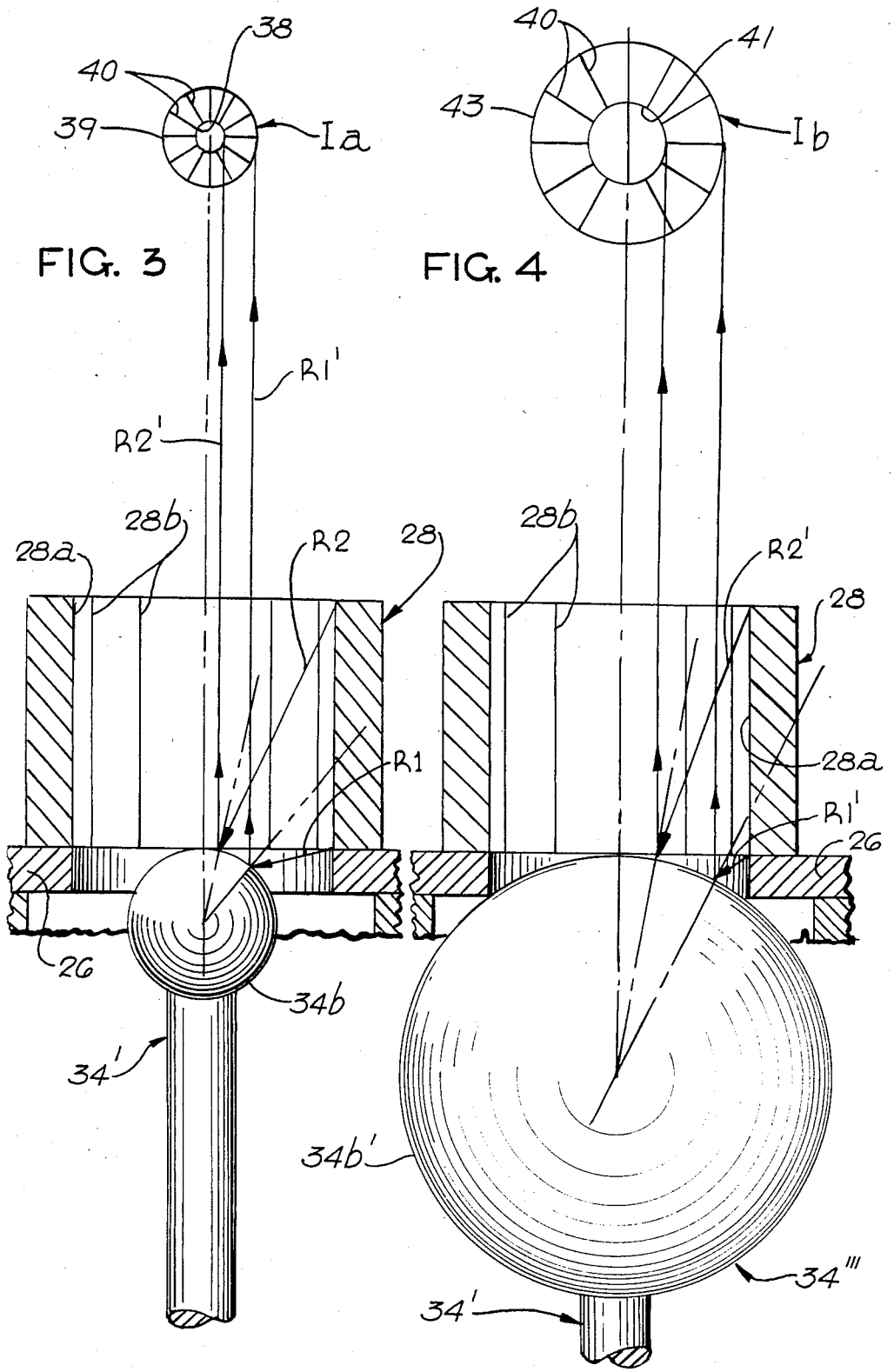

PANORAMIC VIEW BORE EXAMINING APPARATUS

TECHNICAL FIELD OF INVENTION

This invention relates to apparatus for examining defects and other details of the defining walls of a bore (sometimes referred to as a through hole herein).

PRIOR ART

Heretofore, the surface details of bores have been examined by an apparatus referred to as a borescope. A borescope in one form is a device comprising a small tube with a prism or small mirror at one end thereof and a means for directing light upon a selected portion of the bore surface so that an image of the selected portion of the bore surface being examined will be directed by the prism or mirror to the tube where it can be examined at the opposite end thereof. In another form it is a microscope provided with a wide-angle "fish eye" objective lens. Because of practical minimum size limitations for such devices, presently the minimum size holes that can be examined therewith is of the order of magnitude of ⅛". Also, such devices give only a view of a limited portion of the bore at one time, the degree of magnification which can be practically achieved is unduly limited, and the light collecting ability of such a device is limited so that the image does not always have the degree of intensity ideally desired.

The various features of the present invention overcome one or more of these disadvantages, and the preferred form of the invention overcomes all of these disadvantages.

SUMMARY OF THE INVENTION

In the most preferred form of the invention, a conventional microscope is used as the magnifying portion of the bore examining apparatus. However, it should be understood that in the broadest aspect of the invention any suitable magnifying means may be utilized. In any event, the apparatus includes support means, which may be a horizontal support platform, for supporting the article to be examined with both ends of the bore to be viewed exposed. The horizontal platform is provided with a viewing aperture extending completely therethrough and designed to removably receive an annular insert disc for supporting an article to be examined of a size smaller than the upper portion of the platform viewing aperture. The article is supported so that the bore thereof is oriented vertically and centered with respect to the platform viewing aperture or the opening in the center disc when the insert is employed.

At the heart of the present invention is the provision of a uniquely shaped reflector which is mounted on a reflector support preferably located below the horizontal platform or other article support means. A set of reflectors of different sizes and/or shapes is provided. Each reflector is removably supportable upon the reflector support so that a reflector can be selected which will be best suited for the particular size of bore to be examined and the nature of the image desired from the apparatus.

Each reflector has a convex, well polished reflecting surface forming a solid of revolution about the viewing axis thereof, which is a vertical axis in the example of the invention being described, and which is coaxial with the longitudinal axis of the platform viewing aperture and the bore of the article to be examined. In such a case, this reflecting surface faces the bore to be examined and produces a panoramic 360° view of the bore projected towards the viewing lens of the microscope or the magnifying means utilized in the invention. In many applications of the invention, a reflector is selected with a diameter smaller than the bore to be examined, so that by raising or lowering the article with respect to the reflector, the reflector can be placed at any selected position within or below the bore. This movement of the article gives a variable magnification and viewing field of the bore.

The microscope or other magnifying means utilized is focussed upon the image reflected from the reflecting surface of the reflector, and the viewing field is varied by varying the position of the article support means with respect to the reflector and the magnifying means.

The image obtained with the reflector described gives a view of the walls bore as though the walls of the bore were unfolded onto a flat surface, so as to give the viewer the impression that he is looking down at a flat disc. When the reflector is positioned below the bore the bore image frequently looks like an annular disc having an inner circular margin representing the distant end of the bore being examined (i.e., the top of the bore), and an outer circular margin representing the nearest end of the bore (i.e. the bottom of the bore). Such an optical system permits examination over a 360° viewing angle of the inside surface of the bore being examined and shows details of grooves, undercuts, cross bores as well as angulated cross bores in any desired degree of magnification available. By varying the size and shape of the reflector as well as the amount of optical magnification, the degree of optical unfolding is varied at the will of the user of the apparatus.

With the apparatus just described, reflectors of very small size can be made which can fit into very small apertures, as, for example, apertures as small as about 0.020", unlike the borescopes of the prior art which are inherently much more bulky than the smallest reflector which can be readily manufactured. Also, the limitations of magnification and light collecting qualities found in the borescopes of the prior art described are not present in the typical system of the present invention just described.

The above described and other features and advantages of the invention will become apparent upon making reference to the specification to follow, the claims and the drawings.

DESCRIPTION OF DRAWINGS

FIG. 3 is a diagrammtic view showing the manner in which the present invention provides in the viewing field of a microscope a 360° panoramic view of the interior of a bore of an article where the reflector has a spherical shape of a size to fit within the bore involved and is positioned just below the bore;

FIG. 4 is a view similar to FIG. 3 except that it shows the image in the microscope of the same article produced with a reflector which has a much larger diameter than that shown in FIG. 3;

DESCRIPTION OF EXEMPLARY FORM OF THE INVENTION SHOWN IN THE DRAWINGS

Figure 1:
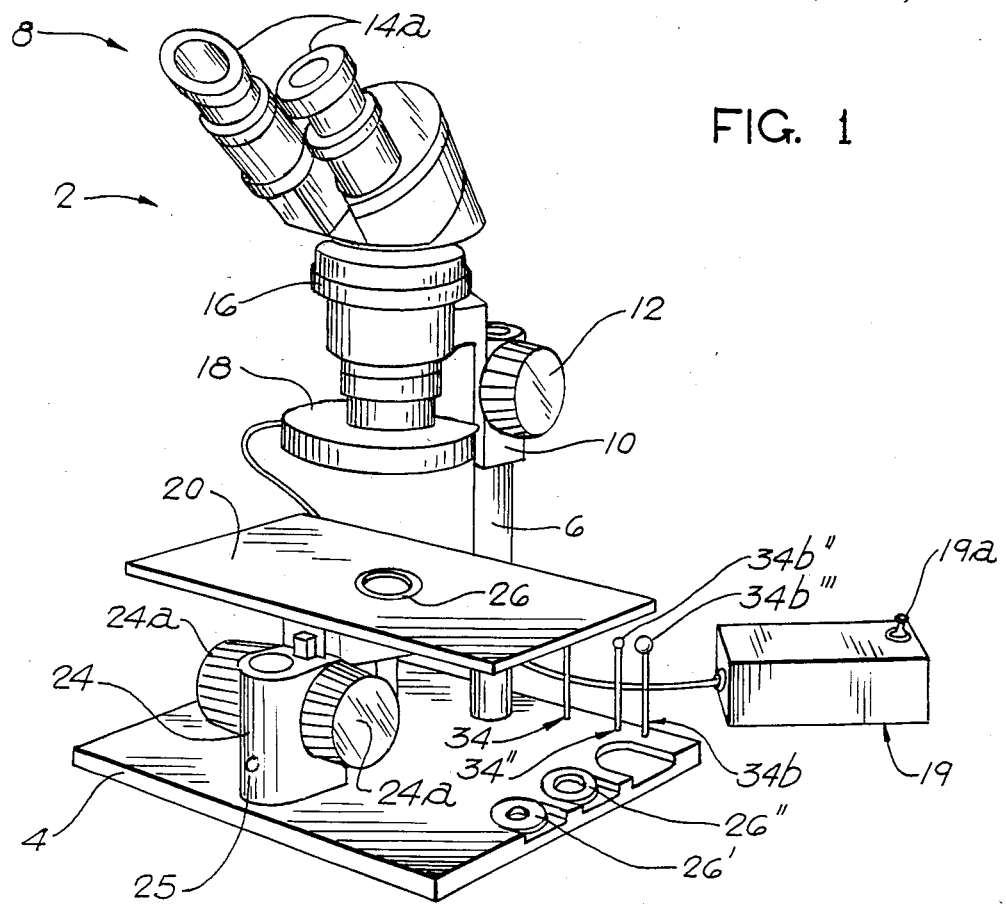
FIG. 1 is perspective view of the preferred form of the present invention.

Referring now to FIG. 1, the apparatus of the invention there shown and identified generally by reference numberal 2 has a base 4 having a vertical microscopic mounting post 6 at the rear thereof. The post 6 supports for vertical movement a ccommercially available microscope inspection body 8, namely a Nikon SMZ-II stereozoom microscope. The microscope has a lighting head 18 having an annular fluorescent lighting source (not shown) which is selectively energized from a control box 19 having an on-off toggle switch 19a. The present invention is useful with monocular as well as binocular or trinocular type industrial inspection microscopes and can also be used with other forms of lighting.

The microscope body 8 is shown having a focussing mount 10 including a focussing knob 12 which when rotated varies the position of the focussing mount 10 on the vertical post 6 in a conventional way. The microscope body 8 is shown having a pair of eye pieces 14a through which the user views the specimen being examined. A zoom ring 16 is shown which, when rotated, varies the degree of magnification produced by the microscope. As is conventional, the microscope body 8 has a downwardly facing image-receiving window (not shown) which overlies an article support platform 20 therebelow, which is uniquely designed for the present invention in a manner to be described.

The platform 20 is supported on a framework 22 (FIG. 2) which includes a vertical rack 22a which meshes with a pinion gear 24b associated with a platform elevation adjusting means. As shown, this means includes a housing 24 projecting upwardly from the front of the platform 4. A platform elevation locking screw 25 is exposed at the front of this housing 24. A pair of adjustment knobs 24a project outwardly from the opposite sides of the housing 24. The knobs are mounted on a shaft on which the pinon gear 24b is also mounted, so that rotation of either one of the knobs 24a will result in a vertical movement of the platform 20.

The platform 20 has a viewing aperture 25 extending completely therethrough, the aperture 25 including a relatively small cylindrical bottom section 25a which opens onto a much larger upper cylindrical aperture section 25b centered with respect to the bottom aperture section 25a. The upper aperture section 25b forms an insert disc mounting recess having an annular seat 25b' upon which may rest a specimen support insert disc 26. The insert disc 26 has a central circular aperture 26a which will generally be at least as large or larger than the diameter of the bore of an article to be supported thereon. The upper surface of the insert disc 26 when inserted upon the recess seat will be flush with the rest of the horizontal surface of the platform 20, so as to form part of a larger horizontal support for an article to be examined by the apparatus of the invention.

Figure 2:
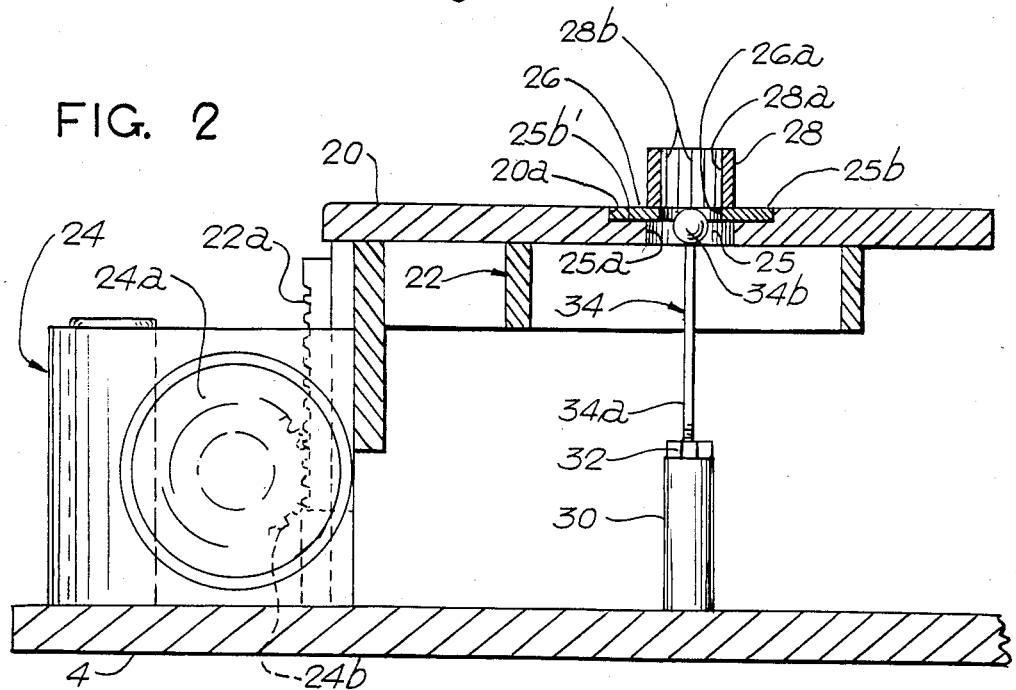
FIG. 2 is an enlarged fragmentary partial vertical sectional view through the base and platform portion of the apparatus shown in FIG. 1.

FIG. 2 shows an article 28 of cylindrical shape and having a vertical cylindrical bore 28a to be examined. For the purpose of illustrating how the present invention operates, there is drawn on the surface of the bore 28a axially extending lines 28b which will appear as radial lines when viewed in the microscope viewing field, as shown in FIGS. 3 and 4 to be later described.

A selection of specimen support insert discs is provided. To this end, the platform 4 may be provided with a number of circular recesses which open onto the outer edge of the platform 4 and into which recesses may be placed insert discs 26, 26', or 26", which have different sized apertures 26a to accomodate articles having different bore sizes.

As previously indicated, at the heart of the present invention is the provision of a selection of unique reflectors 34, 34', 34", 34''', etc. Each reflector preferably has a vertical shank 34a having a threaded bottom end (not shown) which threads into a vertical threaded aperture in a reflector support post 30 projecting upwardly from the base 4. The shank of each reflector has a threaded bottom portion (not shown) so that a lock nut 32 mounted on top of the post 30 is threadable therearound to lock the selected reflector element in place securely on the post 30. Each reflector has a convexly shaped reflecting head like 34b on the top thereof. The base 4 in FIG. 1 is shown supporting four reflectors in circular insert mounting holes, the spherical heads 34b''' and 34b" of two of these reflectors being visible in FIG. 1. These reflector heads are of progressively different size to be utilized with specimens of articles to be examined having different ranges of bore sizes. In many cases, it is desirable to utilize a reflector head of a smaller size than the bore of the specimen involved, so that the reflector head can be positioned within the bore, if desired.

A typical way in which the apparatus of the invention illustrated may be used will now be described. Initially, there need be no insert disc 26 in the viewing aperture insert mounting recess of the platform 24. However, in such case, the outer diameter of the article to be examined must be larger than the diameter of the upper aperture section 25b. Otherwise, an insert disc 26, 26' or 26" of appropriate size is placed within the platform recess. Such an insert disc is selected with an aperture 26a at least as large as the diameter of the bore to be examined.

The platform 20 is generally initially elevated to a point where the reflector head 34b, 34b', or 34b", etc., is positioned immediately below the bore involved. The bore of the specimen to be examined is centered with respect to the viewing aperture 25 of the platform, and the elevation of the microscope is adjusted so that the top surface of the reflector head appears focussed in the microscope field. Then, the microscope is brought down slowly so that the image of the inside wall of the bore involved on the surface of the reflector head is visible in as perfect focus as possible. Next, the most desirable viewing field of the bore is obtained by varying the position of the platform and the specimen carried by it relative to the reflector. If a reflector is selected having a head smaller than the bore being examined, the specimen bore can be moved around the reflector head. By making this adjustment and also by varying the degree of magnification of the microscope, as by rotating the zoom ring 16 on the microscope body 8, the most desirable magnified 360° panoramic view of the bore is obtained.

Refer now more particularly to FIGS. 3 and 4, which illustrate how the present invention operates with different size reflector heads and the same magnification adjustment of the microscope. FIG. 3 illustrates a reflector with a relatively small reflector head 34b positioned immediately at the bottom of the bore 28a of the specimen 28. As there shown, light rays R1 and R2 extending from opposite ends of the specimen bore 28a are shown reflected from the reflector head at an angle which generates reflected vertical light rays R1' and R2' extending into the lens system of the microscope. The image seen in the microscope is shown by the image Ia at the top of FIG. 3. It should be noted that axial lines 28b in the bore 28a appear as radial lines 40 in the image Ia, and that the bottom end of the bore 28a is shown by the outer circle 39 and the upper end of the bore 28a is shown by the inner circle 38 of the image Ia.

FIG. 4 shows a reflector 34' having a much larger reflector head 34b'. This head produces light ray lines R1 and R2 extending from the bottom and top ends of the specimen bore 28a and reflected from the reflector head 34b' to produce larger outer and outer circles 43 and 41 in the microscope image Ib. The axial lines in the specimen bore are shown by radial lines 40.

As the platform 20 is moved upwardly from the reflector heads shown in FIGS. 3 and 4, the center circles 38 and 41 and the outer circles 39 and 43 get smaller in diameter. Increasing the magnification of the microscope will increase the size of the center portion of the images shown.

Figure 5:
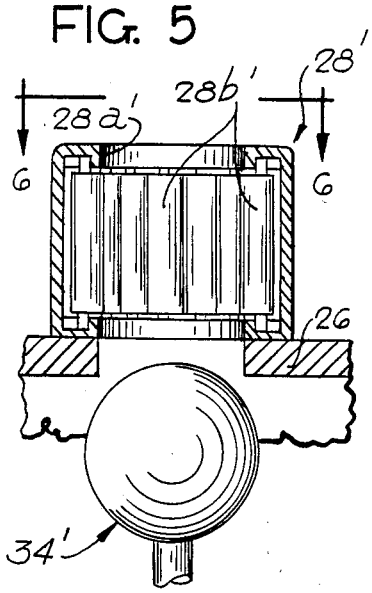
FIG. 5 is a vertical sectional view through an article having a bore to be examined and resting on an insert disc, with a reflector positioned immediately below the bore, the article being a roller bearing.
Figure 6:
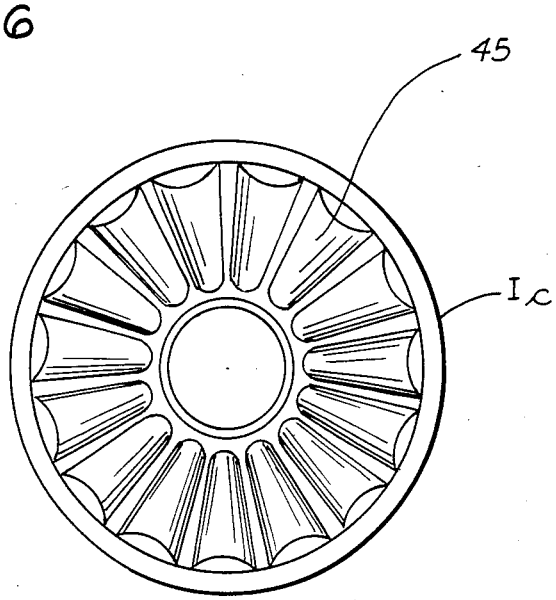
FIG. 6 is a view showing the image of the roller bearing of FIG. 5 produced in a microscope viewing field by an image reflected from the reflector shown in FIG. 5.

Refer now to FIGS. 5 and 6, which illustrate the image produced by the apparatus of the invention when the specimen 28a' is a bearing with external apertures 28a' opening onto a larger compartment in which are pivotally mounted cylindrical roller bearings 28b'. FIG. 6 shows the microscope image of the inside of this bearing when the reflector 34 there illustrated (in larger than actual size) is utilized. Note that the images of the cylindrical bearings have a concial shape.

Figure 7:
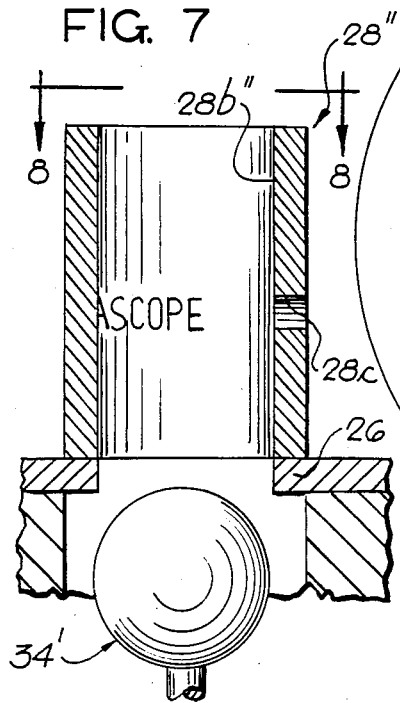
FIG. 7 is a view corresponding to FIG. 5; except that the article involved has been replaced by a cylindrical bearing having a cross-bore intersecting the main vertical bore of the article and the word "PANASCOPE" printed on the wall of the main bore.
Figure 8:
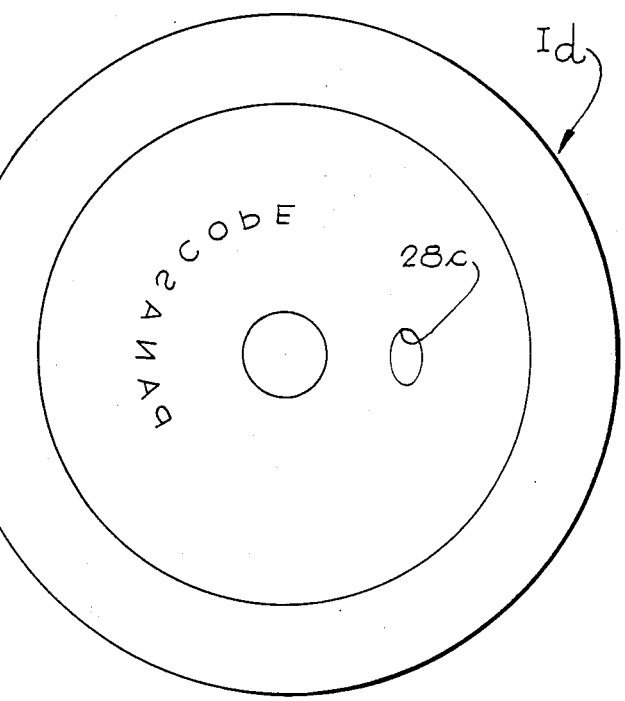
FIG. 8 is a view showing the image of the cylindrical bearing of FIG. 7 produced in a microscope viewing field by an image reflected from the spherical reflector shown in FIG. 7.

FIG. 7 shows a specimen 28" having a main vertical bore 28a" intercepted by a lateral bore 28c. Also, the word "PANASCOPE" is formed on the inside of the bore. The microscope image of this cross-bore and "PANASCOPE" utilizing the reflector 34 is shown by the image Id in FIG. 8.

Thus, the present invention provides a flat disc-like 360° panoramic image presentation of a cylindrical bore surface, and as the specimen is moved relative to the microscope and reflector portions thereof, the viewing field varies accordingly, as if one were unfolding the cylindrical bore involved.

It should be understood that numerous modifications may be made in the most preferred forms of the invention illustrated without deviating from the broader aspects thereof. Thus, for example, although shown with particular reference to a spherical viewing reflector, it will be recognized that other solids of revolution may be similarly employed to suitably modify the panoramic display.

I claim:

1. In a bore examining apparatus for examining the interior walls of articles having a through hole or bore passing completely therethrough along a bore axis, said apparatus including:

support means for supporting an article to be examined, said support means allowing free access to both ends of the bore passing through said article;

a reflector support disposed on one side of said article support means;

a reflector mountable on said reflector support, said reflector having a size and said support being located so that when the reflector is supported on said support said reflecting surface thereof can be positioned within the through hole of the article supported on said platform;

image magnifying means disposed on the other side of said article support means and positioned to be directable along said bore axis into the other end of said bore, said magnifying means being movable toward and away from said support means to focus on the image of the walls of said bore produced by said reflector; and means for moving only said article support means relative to said reflector and said magnifying means to vary the field of view of said bore without varying the relative spacing of said reflector and magnifying means.

2. The apparatus of claim 1 wherein said support means is a horizontal platform with a viewing aperture extending therethrough of a size greater than the size of the largest through holes to be examined, the platform is adapted to support said article with said article through hole centered over said platform aperture, said reflector support is below said platform and adapted to support said reflector so that the reflecting surface of said reflector can be positioned immediately below the through hole of the article supported on said platform, said reflecting surface of said reflector is smaller than the aperture in said platform so that upon the raising or lowering of said platform said reflecting surface of said reflector can be positioned contiguous at least to the bottom of the through hole in said article placed on said platform, and said means for moving said article support means is a means for moving said platform in a vertical direction toward and away from said reflector support.

3. In a bore examining apparatus for examining the interior walls of articles having a through hole or bore passing completely therethrough along a bore axis, said apparatus including a horizontal platform with a viewing aperture extending therethrough of a size greater than the size of the through holes to be examined, the platform being adapted to support an article with said article through hole centered over said platform aperture, a reflector support below said platform, a reflector mountable on said reflector support and having a reflecting surface, said reflector having a size and said support being located so that when the reflector is supported on said support, said reflecting surface thereof can be positioned within the through hole of the article supported on said platform, image magnifying means disposed above said platform, and means for moving one of said platform and reflector to vary the relative position of said reflecting surface and the article through hole, the improvement wherein said platform aperture is configured with an upper shoulder-forming recess adapted to receive an annular article support insert disc, there being provided a plurality of article support insert discs mountable in said recess and having central apertures of varying size corresponding to the varying size of the through holes for the articles to be supported on said platform.

4. The apparatus of claim 1 or 3 wherein said magnifying means is a microscope.

5. The apparatus of claim 1 or 3 wherein there is a selection of reflectors having reflecting surfaces of different curvature or size, some of said reflectors being sized to fit within said through holes of the article to be supported on said article support means.

6. The bore examining apparatus of claim 3 wherein the size of said recess and the size of said insert discs is such that when a selected insert disc is placed in said recess the upper surface thereof is flush with the surface of the platform.

7. A method for examining the defining walls of a through hole in an article, said method comprising: supporting an article to be examined with the through hole exposed at both ends thereof; providing a magnifying means on one side of said article with the magnifying lens thereof positioned to be directed through one end of the through hole in the article, the magnifying means being movable toward and away from said article; positioning a reflector having a convex reflecting surface on the opposite side of said article, said reflecting surface forming a solid of revolution about an axis coaxial with respect to the longitudinal axis of said through hole of the article and facing said through hole so that the reflected image of said through hole defining wall is a 360° panoramic view thereof, moving said article into a position where the image of the defining walls of said thorugh hole is reflected off said reflecting surface toward said magnifying means; moving said magnifying means so as to focus the same upon the image of said walls of said through hole produced by said convex reflecting surface of said reflector and then moving said article either toward or away from said magnifying means to vary the viewing field of said through hole.

8. The method of claim 7 wherein the reflecting surface of said reflector is of a size smaller than the through hole of the article being examined, so that the convex reflecting surface thereof can be moved within the through hole and moving said article or reflector to a position where said reflecting surface is within said through hole.

9. The method of claim 7 wherein said magnifying means is a microscope.

* * * * *